United States Patent
Schultz

Patent Number: 5,644,455
Date of Patent: Jul. 1, 1997

[54] AMORPHOUS DIAMOND-LIKE CARBON GAPS IN MAGNETORESISTIVE HEADS

[75] Inventor: Allan E. Schultz, St. Paul, Minn.

[73] Assignee: Seagate Technology, Inc., Scotts Valley, Calif.

[21] Appl. No.: 211,759

[22] PCT Filed: Dec. 30, 1993

[86] PCT No.: PCT/US93/12685

§ 371 Date: Apr. 15, 1994

§ 102(e) Date: Apr. 15, 1994

[51] Int. Cl.$^6$ ................................................. G11B 5/127
[52] U.S. Cl. ............................................................. 360/113
[58] Field of Search ................................... 360/113, 119, 360/121, 122, 126; 324/207.21

[56] References Cited

U.S. PATENT DOCUMENTS

| | | | |
|---|---|---|---|
| 4,052,749 | 10/1977 | Nomura et al. | 360/123 |
| 5,331,493 | 7/1994 | Schwarz | 360/113 |
| 5,408,373 | 4/1995 | Bajorek et al. | 360/126 |

FOREIGN PATENT DOCUMENTS

| | | |
|---|---|---|
| 0493902A2 | 7/1992 | European Pat. Off. . |
| 0584707A2 | 2/1994 | European Pat. Off. . |
| 2064849 | 6/1981 | United Kingdom . |

OTHER PUBLICATIONS

Patent Abstracts of Japan, vol. 9, No. 79 (P-347) (1802) 9 Apr. 1985 & JP,A,59 210 520 (Yukio Ichinose) 29 Nov. 1984.

Pantent Abstracts of Japan, vol. 11, No. 211 (P-594) 9 Jul. 1987 & JP,A,62 033 317 (Matsushita Electric Ind Co Ltd) 13 Feb. 1987.

Patent Abstracts of Japan, vol. 16, No. 430 (P-1417) 9 Sep. 1992 & JP,A,04 147 411 (Mitsubishi Electric Corp) 20 May 1992.

Patent Abstracts of Japan, vol. 13, No. 167 (P-861) 20 Apr. 1989 & JP,A,01 004 913 (Nec Kansai Ltd) 10 Jan. 1989.

Patent Abstracts of Japn, vol. 11, No. 91 (P-558) (2538) 23 Mar. 1987 & JP,A,61 242 313 (Hitachi Ltd) 28 Oct. 1986.

Patent Abstracts of Japan, vol. 11, No. 49 (P-547) 14 Feb. 1987 & JP,A,61 216 109 (Matsushita Electric Ind Co Ltd) 25 Sep. 1986.

IBM Technical Disclosure Bulletin, vol. 31, No. 12, May 1989, Armonk, N.Y., US, pp. 317–318. "Low Stress Dielectric Coatings for Copper Parts".

IBM Technical Disclosure Bulletin, vol. 34, No. 2, Jul. 1991, Armonk, N.Y., US, pp. 19–20. "Thermal Ink Jet Heater Devices Incorporating Diamond-Like Carbon Films As Protective Overcoats".

*Primary Examiner*—John H. Wolff
*Assistant Examiner*—Allen Cao
*Attorney, Agent, or Firm*—Kinney & Lange

[57] ABSTRACT

An assembly comprises a magnetoresistive element (16), a thermally conductive member or magnetic film (18, 26), and a film of thermally conductive, high electrical resistivity amorphous diamond-like carbon (14, 22) sandwiched between the magnetoresistive element and the thermally conductive member. In an MR head (12), at least one of the half-gaps of the MR head is fabricated of the amorphous diamond-like carbon film to dissipate heat from the MR element to the thermally conductive magnetic film(s) and shield the MR element from the magnetic film(s).

13 Claims, 1 Drawing Sheet

AMORPHOUS DIAMOND-LIKE CARBON GAPS IN MAGNETORESISTIVE HEADS

BACKGROUND OF THE INVENTION

This invention relates to magnetoresistive heads, particularly to magnetoresistive heads for reading data from an adjacent magnetic media.

Magnetoresistive (MR) elements are widely used in magnetic transducing heads for reading data from a magnetic disk. MR elements are characterized in that the resistance of the element changes with variations in the magnetic field due to recorded data on the adjacent magnetic disk. Resistance changes in the MR element are sensed by passing a current through the element and measuring the voltage change across it, or by placing a voltage across the element and measuring the current change through it. In either case, the varying signal represents the data on the disk and the MR head provides an accurate transducer for reading high density digital information from the adjacent magnetic media. Typically, the MR element is located on the magnetic head between two thick soft magnetic films, such as Sendust or permalloy, which act as flux shields for the MR head. Typically, these shields are isolated from the MR element by electrically insulating material, such as aluminum oxide ($Al_2O_3$).

One problem associated with MR heads is that considerable heat is often generated by current passing through the MR element. Although the current is typically small (of the order of milliamperes), the size of the MR element film is likewise small, causing a substantial concentration of the heat in the MR element. While the magnetic film shields could provide a good heat sink for dissipating excess heat generated by the MR head, the presence of the electrically insulating layer between the magnetic films and the MR element thermally insulates the MR element from the magnetic material.

There is, accordingly, a need for at least one of the half-gaps adjacent the MR element be of a material that exhibits high thermal conductivity and low electrical conductivity.

SUMMARY OF THE INVENTION

In accordance with the present invention, at least one of the half-gaps of an MR head located between the MR element and a shield is fabricated of an amorphous diamond-like carbon film having good thermal conductivity and high resistivity characteristics. Preferably, the at least one half-gap formed of the diamond-like carbon film is located between the MR element and the magnetic film formed on the supporting substrate to thereby dissipate heat. Optionally, both half-gaps may be formed of the amorphous diamond-like carbon film.

The amorphous diamond-like carbon film employed in accordance with the present invention is a very hard material resistant to abrasion. Consequently, one optional and desirable feature of the present invention resides in the inclusion of the amorphous diamond-like carbon film to the air bearing surface of the head to protect the MR element from abrasion upon take off and landing of the head against the disc.

Another optional feature of the present invention is the formation of the write gap of a write transducer with an amorphous diamond-like carbon film having good thermal conductivity and high resistivity characteristics.

DETAILED DESCRIPTION OF THE PREFERRED EMBODIMENTS

Figure 1:
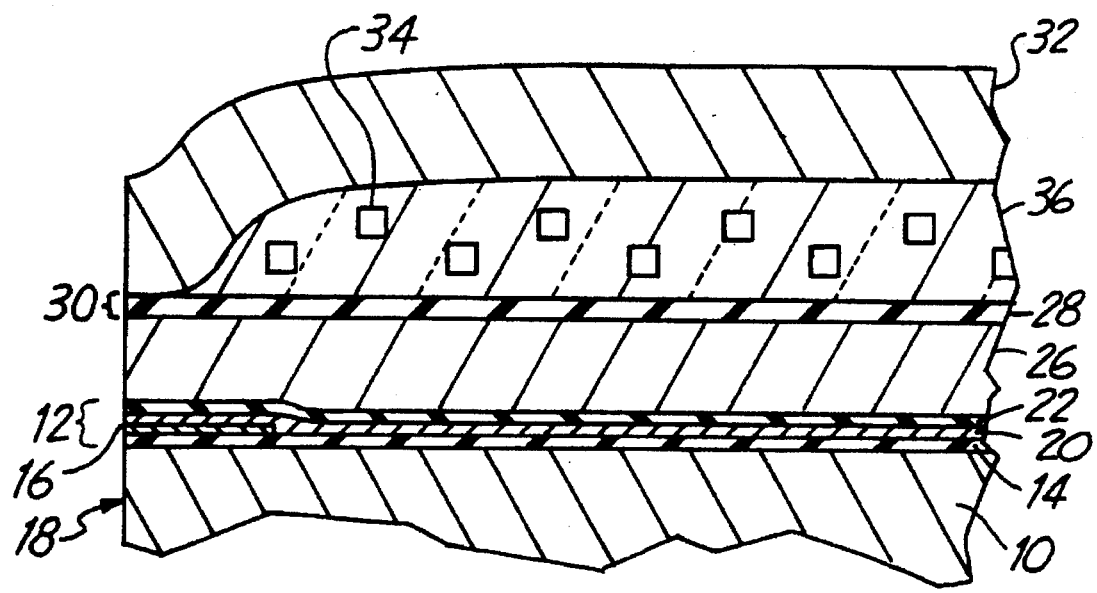
FIG. 1 is a section view of one form of a head in accordance with the presently preferred embodiment of the present invention.
Figure 2:
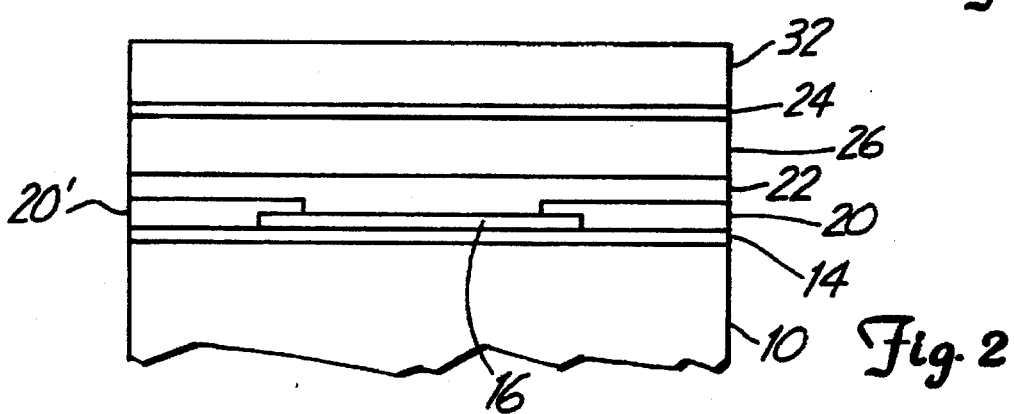
FIG. 2 is a frontal view of the air-bearing surface of the head shown in FIG. 1.

FIGS. 1 and 2 illustrate a magnetic head in accordance with one form of the present invention. The head includes a thick film layer 10 soft magnetic material, such as Sendust, which has been deposited on a substrate (not shown) in a customary manner. A read head 12 is formed of a first electrically insulative, non-magnetic, thermally conductive layer 14 formed of amorphous diamond-like carbon described below. MR element 16 is formed of a layer of magnetic material whose resistance varies with changes in the magnetic field from a disc (not shown) adjacent air-bearing surface 18 of the head. MR element 16 is a preferably thin film of permalloy deposited onto a surface of film 14. Conductive films 20 and 20' are deposited over films 14 and 16, and a second electrically insulative, non-magnetic, thermally conductive layer 22, formed of amorphous diamond-like carbon is deposited over conductors 20 and 20' and MR element 16. As shown particularly in FIG. 2, conductors 20 and 20' are positioned at opposite sides of MR element 16 to form the transducing sensor in the region of MR element 16 between the conductors.

The write head is formed in a conventional manner by a magnetic film 26 (such as permalloy), gap material 28, such as aluminum oxide ($Al_2O_3$) forming the write gap 30, permalloy layer 32 on layers 26 and 28 and encapsulated coil 34 in polymer layers 36.

The present invention is directed to the use of an amorphous diamond-like carbon film forming at least layer 14, and optionally layer 22, sandwiched between MR element 16 and one or both magnetic films 10 and 26. Such material is known as "diamond-like carbon" or "DLC" and is commercially available from Diamonex, Inc. and from Minnesota Mining and Manufacturing Company (3M). The amorphous diamond-like carbon is similar to diamond in physical properties, except that it is amorphous in structure, rather than polycrystaline. The material is a hydrogenated carbon typically having a hydrogen content between about 30 to 50 percent and a large fraction of $sp^3$ carbon-carbon bonds rather than $sp^2$ found in ordinary graphite. The material is typically formed from a hydrogenated carbon feedstock, such as methane ($CH_4$), processed by any of a variety of processes, such as an ion beam deposition process. It is theorized that during formation of diamond-like carbon, hydrogen is removed from the feedstock material forming an amorphous network of $sp^3$ bonded carbon atoms, rather than an ordered array of $sp^2$ bonded carbon, i.e. graphite. The material resembles a hard, highly cross-linked polymer and exhibits a higher thermal conductivity than common electrical insulating material (such as $Al_2O_3$) and a high electrical resistivity, of the order of about $10^{10}$ $\Omega$-cm. Amorphous diamond-like carbon films are similar to diamonds in that they exhibit very high hardness ranges (1,000 to 5,000 on the Vickers hardness scale), a low coefficient of friction (of the order of less than 0.1) and densities between about 1.7 and 2.2. The material is commercially referred to as "diamond-like" because of its similarity in characteristics to natural and synthetic diamond, which are polycrystaline materials rather than amorphous materials. Moreover, like natural and synthetic diamond, the diamond-like carbon exhibits a high resistivity.

The diamond-like carbon layer 14 is preferably formed by ion beam deposition onto layer 10, and the diamond-like carbon layer 22 is preferably formed by ion beam deposition onto layers 16 and 20, 20'. The relative simplicity of the ion beam process also allows the formation of low defect films, which are necessary for the formation of very thin insulating layers between the MR element and the magnetic film shields.

Diamond-like carbon layer 14 and/or 22 provides dissipation of heat in MR element 16 to thermally conductive magnetic shield layers 10 and/or 26. Layer 10 and/or 26 provides a good heat sink for the dissipation of heat. At the same time, the diamond-like carbon of layer 14 and/or 22 provides a good electrical insulator for the gap material of the MR head. Another advantage of diamond-like carbon as a gap material is its ability to be dry etched. Simple oxygen-based gas phase reactions can be used with standard photo processes to pattern diamond-like carbon films. This avoids the need to use more complex and difficult to control patterning processes, such as wet etching and ion milling.

Figure 3:
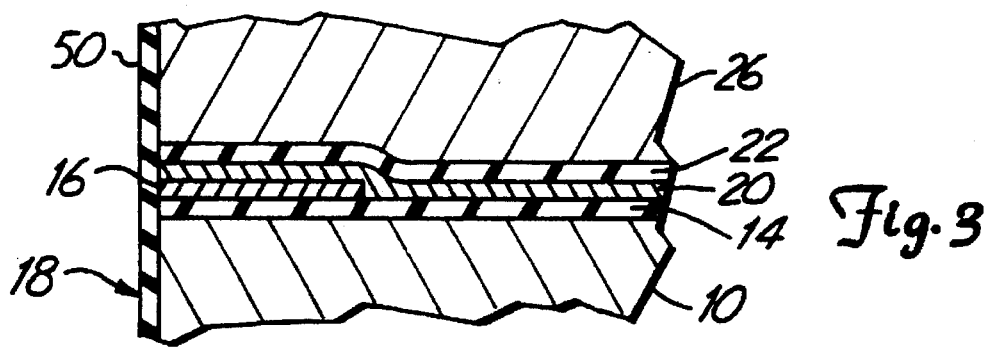
FIG. 3 is a partial section view, as in FIG. 1, of an MR head in accordance with a modification of the present invention.

FIG. 3 illustrates a modification of the present invention that layer 50 forms air bearing surface 18 over MR element 16. Since the diamond-like carbon forming layer 14 is extremely hard (Vickers hardness scale of 1,000 to 5,000), layer 50 provides a shield for MR element 16 against abrasion upon take off and/or landing of the head on the disc.

Another optional feature of the present invention is the use of the diamond-like carbon to form write gap 30 for the write transducer. In this regard, layer 28 is formed of the diamond-like carbon so that the write gap is thermally conductive and hard. The use of diamond-like carbon for layer 28 provides a wear-resistant gap.

Magnetoresistive elements of MR heads currently in use have thicknesses of the order of about 300 Angstroms (compared to magnetic layers of about 3 microns thick and electrically insulating $Al_2O_3$ gap layers between about 1000 and 4000 Angstroms thick). The use of diamond-like carbon to increase heat dissipation from the MR element permits the use of even thinner layers for the MR element without risking destruction by enhanced electromigration. Thinner MR read elements give higher signals which in turn permit reduction of the track width of the recorded magnetic bit, thereby increasing data density and contributing to even higher performance of disc drives than heretofore possible.

Although the present invention is described as having both gap layers 14 and 22 constructed of amorphous diamond-like carbon, it is understood that it may be desirable to form only one of those films 14 or 22 of such material. For example, it may be desirable to dissipate heat only to film 10 in certain cases, such as to minimize thermally induced stress where layers 16, 20 (20'), 22 and 26 meet. In either case, the high thermal of the material of layer 14 and/or 22 dissipates heat from the MR element to the adjoining magnetic film 10 and/or 26 to help dissipate heat from the MR element.

Although the present invention has been described with reference to preferred embodiments, workers skilled in the art will recognize that changes may be made in form and detail without departing from the spirit and scope of the invention.

What is claimed is:

1. A sensor for a disc drive for reading data from a magnetic disc and for writing data to the magnetic disc comprising:

a first thermally conductive magnetic film of soft magnetic material;

a magnetoresistive element;

at least two conductors attached to different regions of he magnetoresistive element;

a first thermally conductive resistive film containing thermally conductive, high electrical resistivity amorphous diamond-like carbon sandwiched between the first thermally conductive magnetic film on one side of the first thermally conductive resistive film and the magnetoresistive element and the conductors on the opposite side of the first thermally conductive resistive film;

a second thermally conductive magnetic film of soft magnetic material; and a second thermally conductive resistive film of thermally conductive, high electrical resistivity amorphous diamond-like carbon sandwiched between the second thermally conductive magnetic film on one side of the second thermally conductive film and the magnetoresistive element and the conductors on the other side of the second thermally conductive resistive film, wherein both the magnetoresistive element and the conductors directly contact the first and second thermally conductive resistive films.

2. A sensor of claim 1, wherein the amorphous diamond-like carbon has a hydrogen content between about 30 and 50%.

3. A sensor of claim 1, wherein the write transducer includes a write gap formed of a third film of thermally conductive, high electrical resistivity amorphous diamond-like carbon.

4. A sensor of claim 1, wherein the first and second thermally conductive resistive films consist essentially of thermally conductive, high electrical resistivity amorphous diamond-like carbon.

5. A sensor of claim 1, wherein the amorphous diamond-like carbon has a resistivity of the order of $10^{11}$ $\Omega$-cm.

6. A sensor of claim 1, further including a third thermally conductive resistive film of diamond-like carbon on a face of the magnetoresistive element to form an air bearing surface of the sensor.

7. A sensor for a disc drive for reading data from a magnetic disc and for writing data to the magnetic disc comprising a first thermally conductive magnetic film of soft magnetic material;

a magnetoresistive element;

at least two conductors attached to different regions of the magnetoresistive element;

first electrically insulating and thermally conductive means sandwiched between the first thermally conductive magnetic film on one side of the first thermally conductive resistive film and the magnetoresistive element and the conductors on the opposite side of the first thermally conductive resistive film for electrically insulating the magnetoresistive element and the conductors from the first thermally conductive magnetic film and for thermally coupling the magnetoresistive element and the conductors to the first thermally conductive magnetic film;

a second thermally conductive magnetic film of soft magnetic material; and second electrically insulating and thermally conductive means sandwiched between the second thermally conductive magnetic film on one side of the second thermally conductive resistive film and the magnetoresistive element and the conductors on the opposite side of the second thermally conductive resistive film for electrically insulating the magnetoresistive element and the conductors from the second thermally conductive magnetic film and for thermally coupling the magnetoresistive element and the conductors to the second thermally conductive magnetic film, wherein both the magnetoresistive element and the conductors directly contact the first and second electrically insulating and thermally conductive means.

8. A sensor of claim 7, wherein the first and second electrically insulating and thermally conductive means consist essentially of respective first and second films of thermally conductive, high electrical resistivity amorphous diamond-like carbon.

9. A sensor of claim 7, wherein the first and second electrically insulating and thermally conductive means comprise respective first and second films of thermally conductive, high electrical resistivity amorphous diamond-like carbon.

10. A sensor of claim 9, wherein the amorphous diamond-like carbon has a hydrogen content between about 30 and 50%.

11. A sensor of claim 9, wherein the amorphous diamond-like carbon has a resistivity of the order of $10^{11}$ Ω-cm.

12. A sensor of claim 9, wherein the write transducer includes a write gap formed of a third film of thermally conductive, high electrical resistivity amorphous diamond-like carbon.

13. A sensor of claim 9, further including a third thermally conductive resistive film of diamond-like carbon on a face of the magnetoresistive element to form an air bearing surface of the sensor.

* * * * *

UNITED STATES PATENT AND TRADEMARK OFFICE
CERTIFICATE OF CORRECTION

PATENT NO. : 5,644,455
DATED : JULY 1, 1997
INVENTOR(S) : ALLAN E. SCHULTZ

It is certified that error appears in the above-identified patent and that said Letters Patent is hereby corrected as shown below:

On the title page [56] OTHER PUBLICATIONS, second reference delete "Pantent", insert --Patent--

Col. 2, line 10, after "10", insert --of--

Col. 3, line 52, after "thermal", insert --conductivity--

Col. 4, line 2, delete "he", insert --the--

Signed and Sealed this

Twenty-fifth Day of November, 1997

Attest:

BRUCE LEHMAN

Attesting Officer

Commissioner of Patents and Trademarks